(12) United States Patent
Wang

(10) Patent No.: US 7,270,452 B2
(45) Date of Patent: Sep. 18, 2007

(54) LIGHT EMITTING HANDLE FOR VEHICLE

(75) Inventor: Ming-Cheng Wang, Tainan Hsien (TW)

(73) Assignee: Yu Lin Enterprise Co., Ltd, Yung Kang (TW)

( * ) Notice: Subject to any disclaimer, the term of this patent is extended or adjusted under 35 U.S.C. 154(b) by 30 days.

(21) Appl. No.: 11/253,230

(22) Filed: Oct. 18, 2005

(65) Prior Publication Data

US 2007/0086201 A1 Apr. 19, 2007

(51) Int. Cl.
*B60Q 1/00* (2006.01)
(52) U.S. Cl. ...................... 362/501; 362/540
(58) Field of Classification Search ............. 362/605, 362/501, 488, 511, 540
See application file for complete search history.

(56) References Cited

U.S. PATENT DOCUMENTS

| | | | |
|---|---|---|---|
| 6,974,134 B1 * | 12/2005 | Macri et al. ............... 296/1.02 |
| 7,104,675 B2 * | 9/2006 | Chen .......................... 362/490 |
| 2004/0076014 A1 * | 4/2004 | Bach et al. ................ 362/501 |
| 2006/0274539 A1 * | 12/2006 | Chou ......................... 362/459 |

\* cited by examiner

*Primary Examiner*—Thomas M. Sember
*Assistant Examiner*—Julie A. Shallenberger
(74) *Attorney, Agent, or Firm*—Alan Kamrath; Kamrath & Associates PA

(57) ABSTRACT

A light emitting handle includes a handle body, a light emitting device mounted on the handle body to emit light outward, and a light guide device mounted on the handle body to guide and reflect the light of the light emitting device outward from the handle body. The light emitting handle is mounted on the door of a car or on two sides of the tail portion of a motorcycle. Thus, the light emitting handle emits light outward constantly so that the light emitting handle has a lightening effect when the car or motorcycle is turned around so as to provide a warning effect to other person, thereby preventing the car or motorcycle from incurring a traffic accident.

17 Claims, 5 Drawing Sheets

LIGHT EMITTING HANDLE FOR VEHICLE

BACKGROUND OF THE INVENTION

1. Field of the Invention

The present invention relates to a light emitting handle, and more particularly to a light emitting handle for a vehicle, such as a car, a motorcycle or the like.

2. Description of the Related Art

A conventional vehicle, such as a car, a motorcycle or the like, has warning lights, such as headlights, taillights, turn signals or the like, so as to provide an indication effect to other people located adjacent to the vehicle. However, the conventional vehicle is not provided with any warning light at the two sides thereof, so that other people cannot clearly inspect passage of the vehicle, especially at the night or at a dark zone, thereby causing danger to other people passing by the vehicle.

SUMMARY OF THE INVENTION

In accordance with the present invention, there is provided a light emitting handle, comprising a handle body, a light emitting device mounted on the handle body to emit light outward, and a light guide device mounted on the handle body to guide and reflect the light of the light emitting device outward from the handle body.

The primary objective of the present invention is to provide a light emitting handle that is mounted on the door of a car or mounted on two sides of the tail portion of a motorcycle to emit light outward.

Another objective of the present invention is to provide a light emitting handle that emits light outward constantly so that the light emitting handle has a lightening effect when the car or motorcycle is turned around so as to provide a warning effect to other person, thereby preventing the car or motorcycle from incurring a traffic accident.

Further benefits and advantages of the present invention will become apparent after a careful reading of the detailed description with appropriate reference to the accompanying drawings.

DETAILED DESCRIPTION OF THE INVENTION

Figure 1:
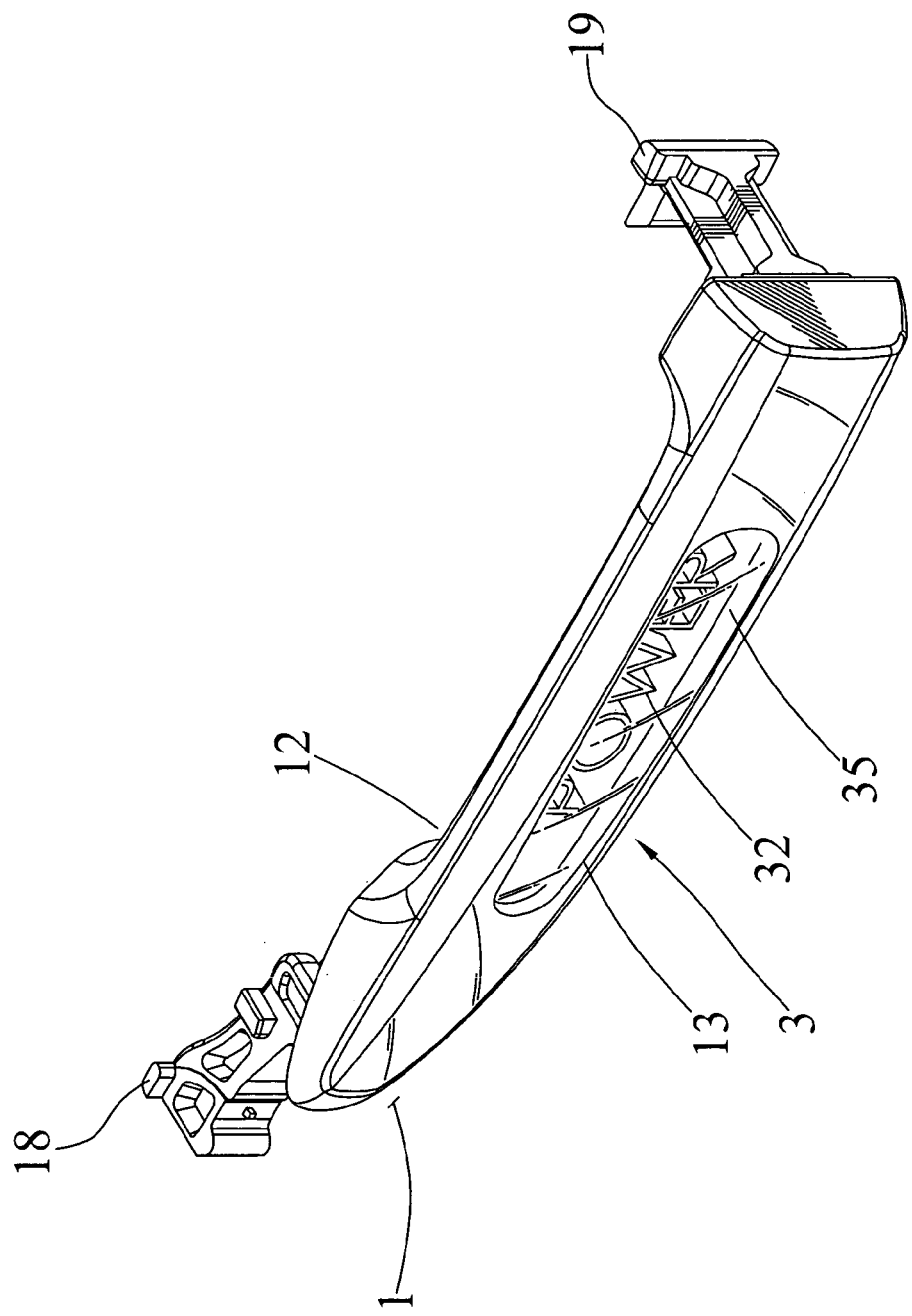
FIG. 1 is a perspective view of a light emitting handle in accordance with the preferred embodiment of the present invention.
Figure 2:
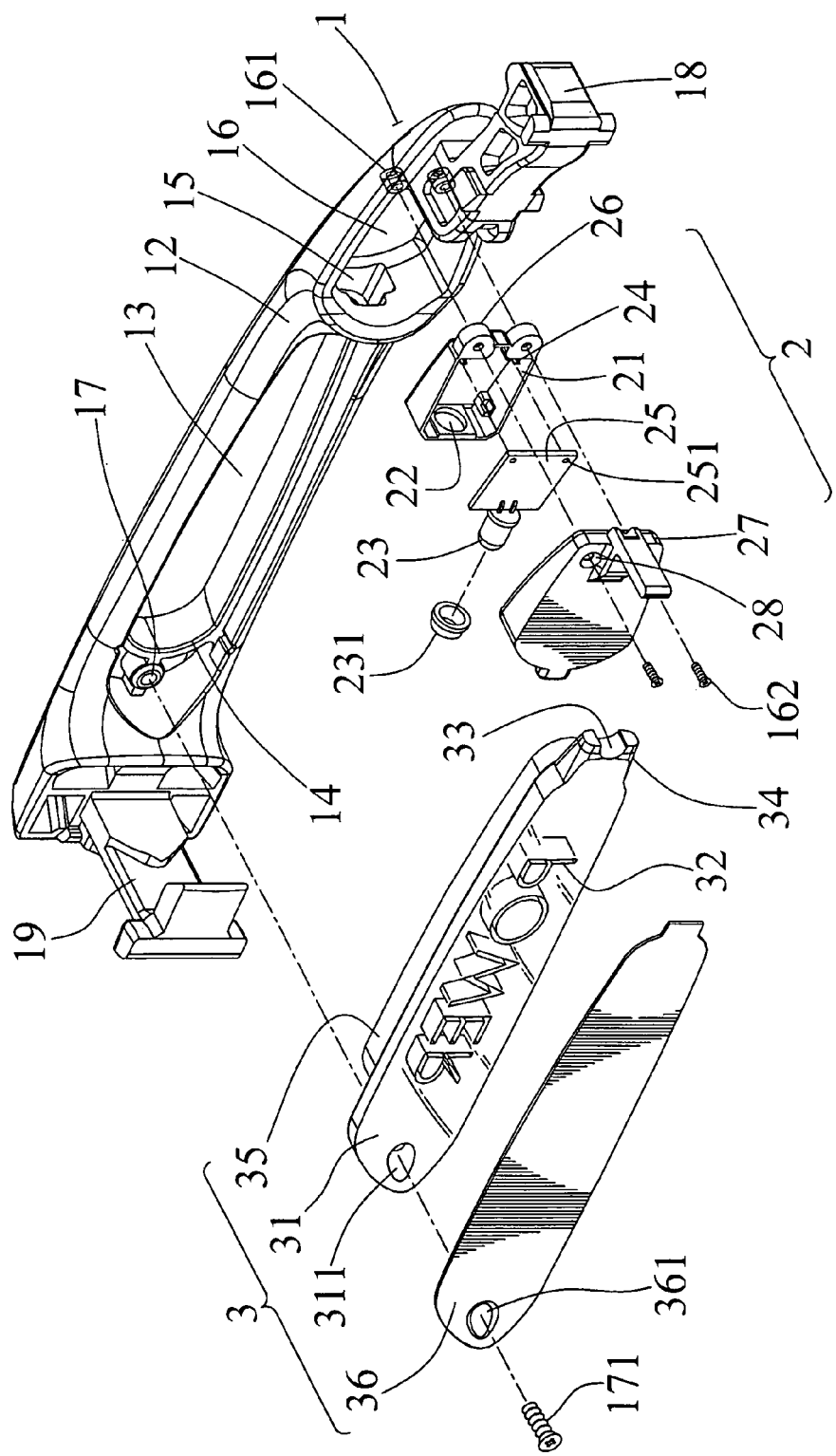
FIG. 2 is an exploded perspective view of the light emitting handle as shown in FIG. 1.
Figure 3:
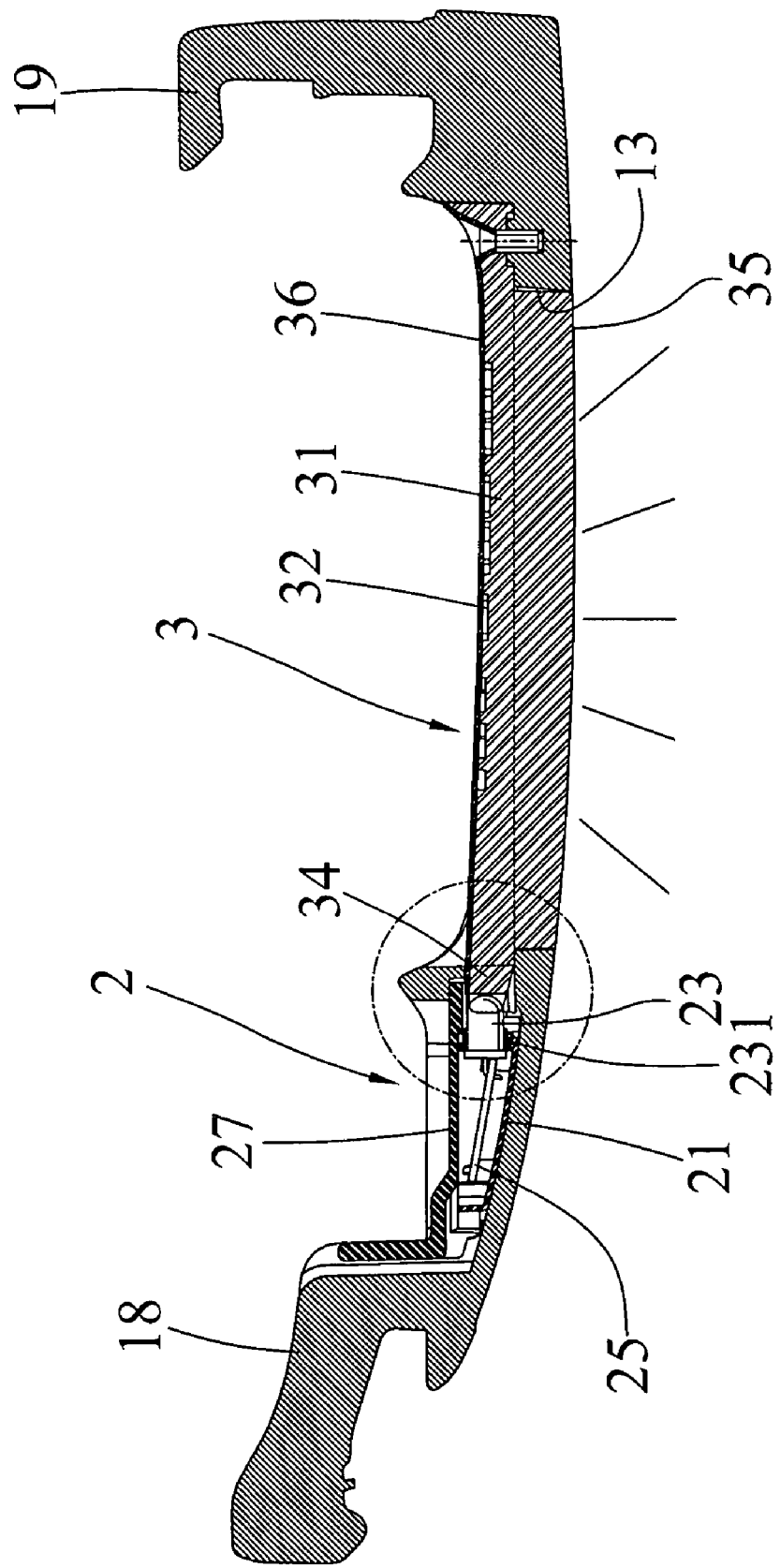
FIG. 3 is a plan cross-sectional view of the light emitting handle as shown in FIG. 1.
Figure 4:
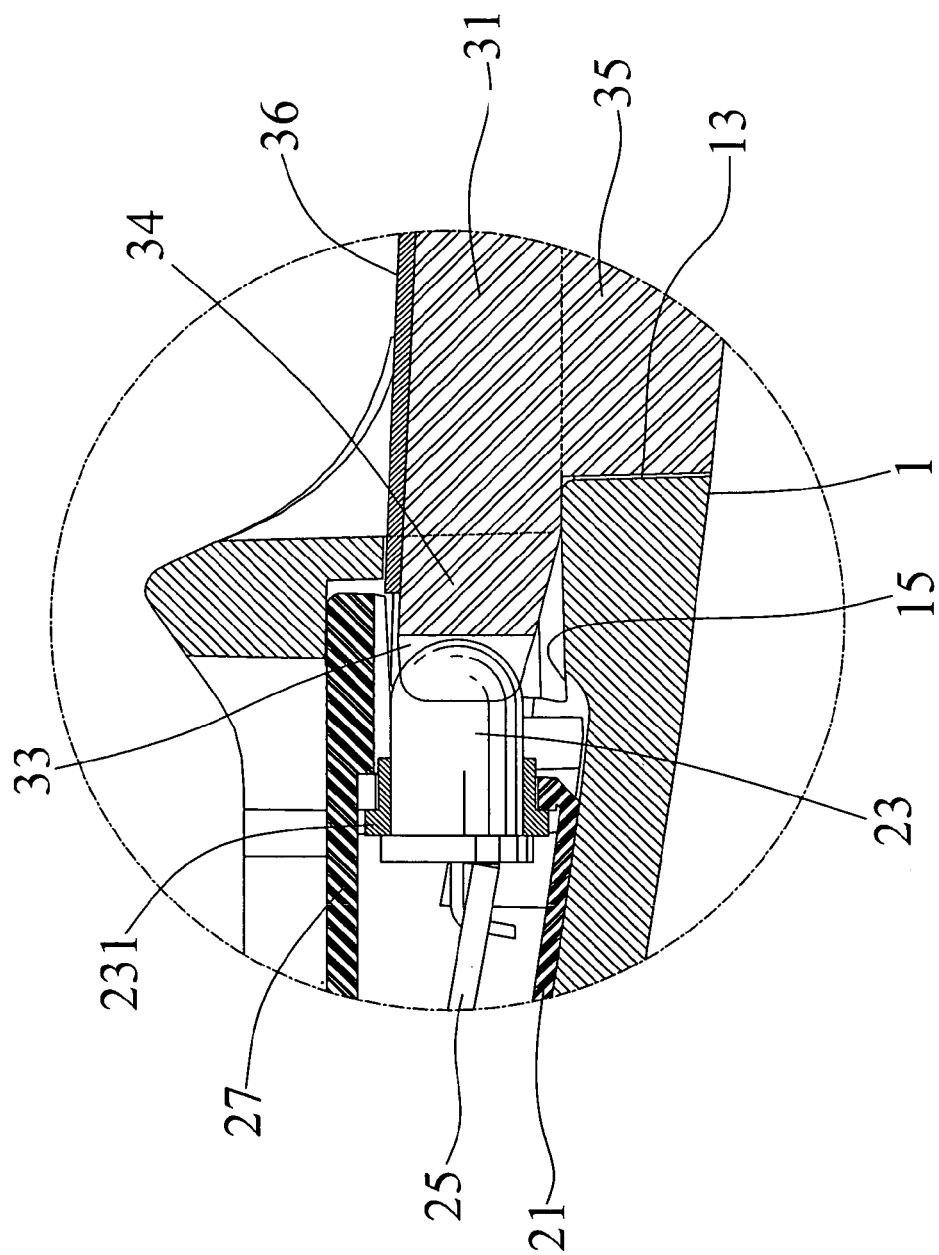
FIG. 4 is a locally enlarged view of the light emitting handle as shown in FIG. 3.

Referring to the drawings and initially to FIGS. 1-4, a light emitting handle in accordance with the preferred embodiment of the present invention comprises a handle body 1, a light emitting device 2 mounted on the handle body 1 to emit light outward, and a light guide device 3 mounted on the handle body 1 to guide and reflect the light of the light emitting device 2 outward from the handle body 1.

The handle body 1 has two ends provided with a first connecting portion 18 and a second connecting portion 19 to attach the handle body 1 to a vehicle, such as a car, a motorcycle or the like. The handle body 1 has a side formed with a receiving chamber 16 to receive the light emitting device 2 and a mediate portion formed with a recessed portion 12 to facilitate a user holding the handle body 1. The receiving chamber 16 of the handle body 1 has a side formed with two screw bores 161. The recessed portion 12 of the handle body 1 has a slot 13 for mounting the light guide device 3. The slot 13 of the handle body 1 has a first end formed with a passage 15 connected to the receiving chamber 16 and a second end formed with a screw hole 17. The slot 13 of the handle body 1 has a periphery formed with a locking portion 14.

The light emitting device 2 is mounted in the receiving chamber 16 of the handle body 1 and includes a first fixing seat 21 mounted in the receiving chamber 16 of the handle body 1, a circuit board 25 mounted in the first fixing seat 21, a light emitting member 23 connected to the circuit board 25 and extended into the passage 15 of the handle body 1 to emit light toward the light guide device 3, a gasket 231 mounted on the light emitting member 23 so that the light emitting member 23 produces a light gathering effect, and a second fixing seat 27 mounted in the receiving chamber 16 of the handle body 1 and combined with the first fixing seat 21 to cover the circuit board 25.

The circuit board 25 of the light emitting device 2 has a periphery formed with two positioning bores 251. The first fixing seat 21 of the light emitting device 2 has a first side formed with a mounting hole 22 connected to the passage 15 of the handle body 1, and the light emitting member 23 is mounted in the mounting hole 22 of the first fixing seat 21. The first fixing seat 21 of the light emitting device 2 has a second side formed with two first positioning holes 26. The first fixing seat 21 of the light emitting device 2 has a periphery formed with two positioning posts 24 secured in the positioning bores 251 of the circuit board 25. The second fixing seat 27 of the light emitting device 2 has a side formed with two second positioning holes 28. The light emitting handle further comprises two locking screws 162 extended through the second positioning holes 28 of the second fixing seat 27 and the first positioning holes 26 of the first fixing seat 21 and screwed into the screw bores 161 of the handle body 1 to position the light emitting device 2 in the receiving chamber 16 of the handle body 1.

The light guide device 3 is mounted in the slot 13 of the handle body 1 and includes a transparent plate 31 mounted on the handle body 1 and having a first end formed with a protruding guide portion 34 extended into the passage 15 of the handle body 1 and enclosed around the light emitting member 23 to guide the light emitted from the light emitting member 23 into the transparent plate 31, a transparent refractive plate 35 mounted on a first side of the transparent plate 31, and a reflective plate 36 mounted on a second side of the transparent plate 31 to enhance the projecting effect of the light emitting member 23 onto the transparent plate 31.

The transparent plate 31 of the light guide device 3 is locked on the locking portion 14 of the handle body 1 and has a second end formed with a through hole 311. The transparent plate 31 of the light guide device 3 is provided with a plurality of characters 32. The guide portion 34 of the transparent plate 31 has a substantially arc-shaped recess 33 encompassing a periphery of the light emitting member 23. The refractive plate 35 of the light guide device 3 is received in the slot 13 of the handle body 1. The reflective plate 36 of the light guide device 3 has an end formed with a through hole 361. The light emitting handle further comprises a locking screw 171 extended through the through hole 361 of the reflective plate 36 and the through hole 311 of the transparent plate 31 and screwed into the screw hole 17 of the handle body 1 to position the light guide device 3 in the slot 13 of the handle body 1.

In operation, when an electric power is supplied to the circuit board 25, the light emitting member 23 emits light beams toward the light guide device 3. Then, the light beams are extended through the recess 33 of the guide portion 34 into the transparent plate 31 to light the characters 32 of the transparent plate 31. Then, the light beams are refracted by the refractive plate 35 and are projected outward from the refractive plate 35. Thus, the light emitting handle emits light outward to provide a lightening effect.

Figure 5:
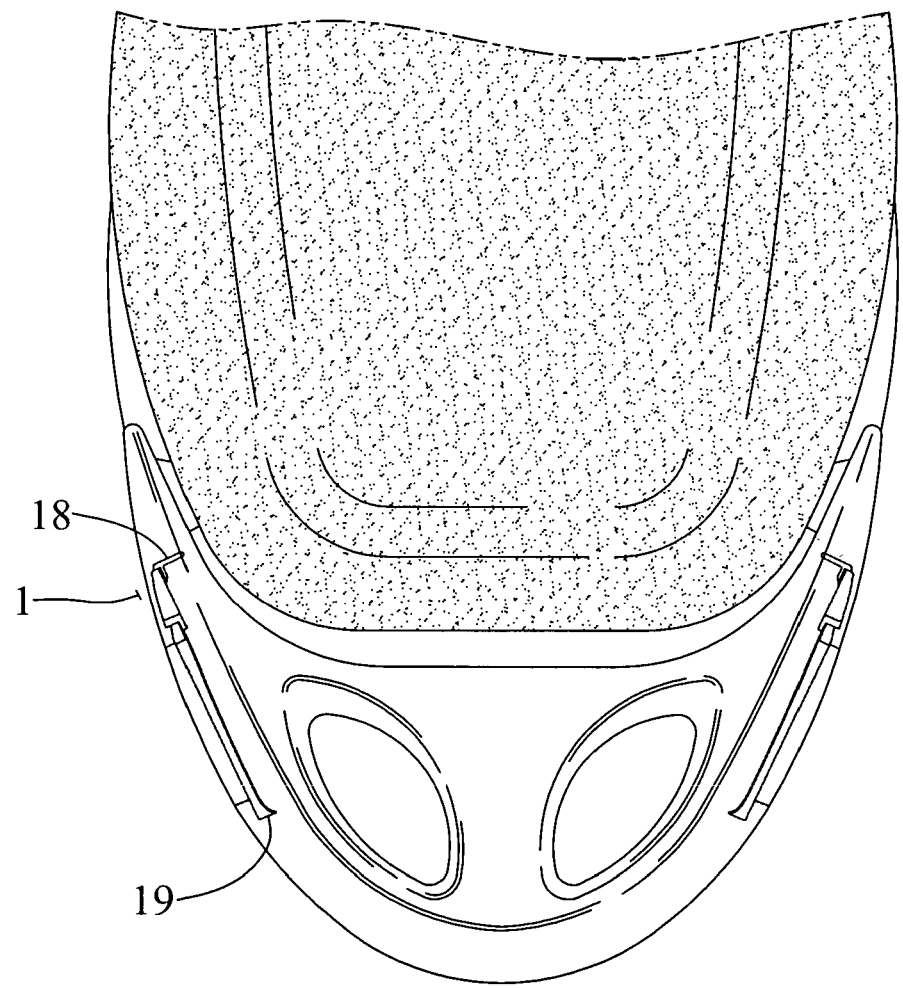
FIG. 5 is a plan view of the light emitting handle for a motorcycle in accordance with the preferred embodiment of the present invention.

In practice, the handle body 1 of the light emitting handle is mounted on the door of a car to emit light outward. Alternatively, as shown in FIG. 5, the handle body 1 of the light emitting handle is mounted on two sides of the tail portion of a motorcycle to emit light outward. Thus, the light emitting handle emits light outward constantly so that the light emitting handle has a lightening effect when the car or motorcycle is turned around so as to provide a warning effect to other person, thereby preventing the car or motorcycle from incurring a traffic accident.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A light emitting handle, comprising:
   a handle body;
   a light emitting device mounted on the handle body to emit light outward; and
   a light guide device mounted on the handle body to guide and reflect the light of the light emitting device outward from the handle body;
   wherein the handle body has a side formed with a receiving chamber to receive the light emitting device and a mediate portion formed with a recessed portion to facilitate a user holding the handle body;
   the recessed portion of the handle body has a slot for mounting the light guide device;
   the slot of the handle body has a first end formed with a passage connected to the receiving chamber.

2. The light emitting handle in accordance with claim 1, wherein the light emitting device includes a first fixing seat mounted in the receiving chamber of the handle body, a circuit board mounted in the first fixing seat, and a light emitting member connected to the circuit board and extended into the passage of the handle body to emit light toward the light guide device.

3. The light emitting handle in accordance with claim 2, wherein the light emitting device further includes a gasket mounted on the light emitting member so that the light emitting member produces a light gathering effect.

4. The light emitting handle in accordance with claim 2, wherein the light emitting device further includes a second fixing seat mounted in the receiving chamber of the handle body and combined with the first fixing seat to cover the circuit board.

5. The light emitting handle in accordance with claim 2, wherein the circuit board of the light emitting device has a periphery formed with two positioning bores, and the first fixing seat of the light emitting device has a periphery formed with two positioning posts secured in the positioning bores of the circuit board.

6. The light emitting handle in accordance with claim 2, wherein the first fixing seat of the light emitting device has a first side formed with a mounting hole connected to the passage of the handle body, and the light emitting member is mounted in the mounting hole of the first fixing seat.

7. The light emitting handle in accordance with claim 6, wherein the receiving chamber of the handle body has a side formed with two screw bores, the first fixing seat of the light emitting device has a second side formed with two first positioning holes, the second fixing seat of the light emitting device has a side formed with two second positioning holes, and the light emitting handle further comprises two locking screws extended through the second positioning holes of the second fixing seat and the first positioning holes of the first fixing seat and screwed into the screw bores of the handle body to position the light emitting device in the receiving chamber of the handle body.

8. The light emitting handle in accordance with claim 1, wherein the light guide device includes a transparent plate mounted on the handle body and having a first end formed with a protruding guide portion extended into the passage of the handle body and enclosed around the light emitting member to guide the light emitted from the light emitting member into the transparent plate.

9. The light emitting handle in accordance with claim 8, wherein the light guide device further includes a transparent refractive plate mounted on a first side of the transparent plate.

10. The light emitting handle in accordance with claim 9, wherein the light guide device further includes a reflective plate mounted on a second side of the transparent plate to enhance a projecting effect of the light emitting member onto the transparent plate.

11. The light emitting handle in accordance with claim 8, wherein the slot of the handle body has a periphery formed with a locking portion, and the transparent plate of the light guide device is locked on the locking portion of the handle body.

12. The light emitting handle in accordance with claim 8, wherein the transparent plate of the light guide device is provided with a plurality of characters.

13. The light emitting handle in accordance with claim 8, wherein the slot of the handle body has a second end formed with a screw hole, the transparent plate of the light guide device has a second end formed with a through hole, the reflective plate of the light guide device has an end formed with a through hole, and the light emitting handle further comprises a locking screw extended through the through hole of the reflective plate and the through hole of the transparent plate and screwed into the screw hole of the handle body to position the light guide device in the slot of the handle body.

14. The light emitting handle in accordance with claim 11, wherein the guide portion of the transparent plate has a substantially arc-shaped recess encompassing a periphery of the light emitting member.

15. The light emitting handle in accordance with claim 9, wherein the refractive plate of the light guide device is received in the slot of the handle body.

16. A light emitting handle, comprising:
   a handle body;
   a light emitting device mounted on the handle body to emit light outward; and a light guide device mounted on the handle body to guide and reflect the light of the light emitting device outward from the handle body;

wherein the handle body has a side formed with a receiving chamber to receive the light emitting device and a mediate portion formed with a recessed portion to facilitate a user holding the handle body;

the recessed portion of the handle body has a slot for mounting the light guide device;

the light emitting device is mounted in the receiving chamber of the handle body, and the light guide device is mounted in the slot of the handle body.

17. The light emitting handle in accordance with claim 1, wherein the handle body has two ends provided with a first connecting portion and a second connecting portion to attach the handle body to a door of a car or to two sides of a tail portion of a motorcycle to emit light outward.

* * * * *